Feb. 27, 1940.  M. WINTERHALTER  2,191,874
SLIDING CLASP FASTENER
Filed March 12, 1938
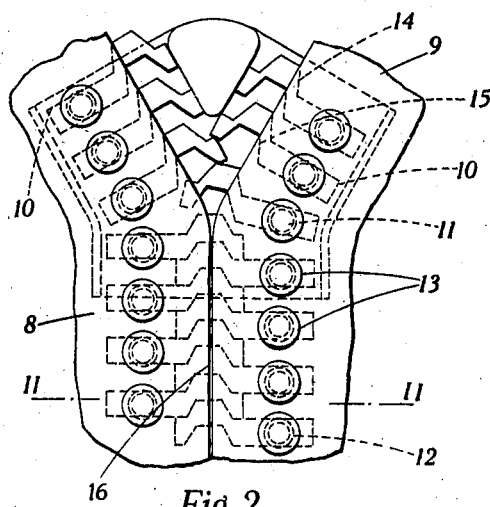
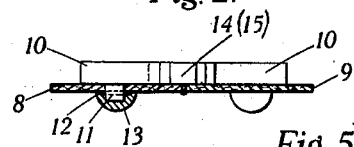
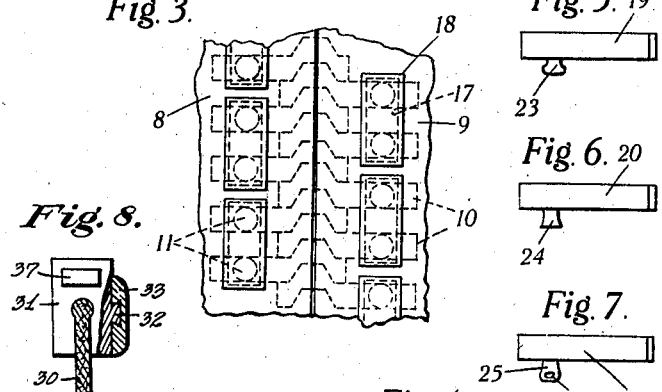
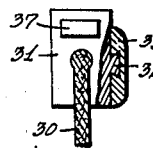
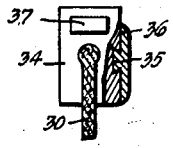
INVENTOR:
MARTIN WINTERHALTER
BY
his ATTORNEY Patented Feb. 27, 1940

2,191,874

UNITED STATES PATENT OFFICE 2,191,874

SLIDING CLASP FASTENER

Martin Winterhalter, Morcote, near Lugano, Switzerland

Application March 12, 1938, Serial No. 195,571
In Germany March 22, 1937

2 Claims. (Cl. 24—205)

The invention refers to sliding clasp fasteners of the kind in which the fastener members are pre-formed and are attached to the tapes of the fastener in a subsequent operation.

It is an object of the invention to provide a fastener the appearance of which is improved so that the fastener can be better suited to the article to which it is to be connected.

It is another object of the invention to provide a fastener in which the members are securely attached to the tapes.

A further object of the invention is to attach easily and securely pre-formed members made of a non-metallic material, such as a composition of artificial resins, to the tapes.

Other objects of the invention will be apparent from the specification as it proceeds.

To make the invention more clearly understood, some embodiments are illustrated by way of example in the accompanying drawing, in which Fig. 1 shows part of a sliding clasp fastener embodying the invention, the tapes of the fastener being shown in their closed position, Fig. 2 is a section on the line II—II of Fig. 1, Figs. 3 and 4 are views similar to Fig. 1, illustrating two further embodiments, Figs. 5, 6, and 7 are side views of different forms of fastener members according to the present invention, and Figs. 8 and 9 show details of further modifications.

In all figures, similar parts are indicated by the same reference numerals.

Referring first to Figs. 1 and 2, the fastener members 10 which are pre-formed, for example, by punching out of a strip of metal in known manner, are provided on one side of the tapes 8 and 9. Each member 10 is provided on one side with a projection 11 which is passed through the tape as shown in Fig. 2. A thin washer 12 is placed over the projection 11 from the other side of the tape, so as to lie against the tape. The washer 12 and the end of the projection 11 are covered by a recessed head 13 of non-metallic material which secures the member in position. The heads 13 which are shown in the form of rivet heads, can be formed in situ by casting, pressing or moulding in a common mould. If desired the members 10 and heads 13 may both be made of metallic or non-metallic material.

The interlocking elements of the members 10 may be shaped to provide ribs 14 and complementary grooves 15 extending the whole width of each member. The interlocking elements may be formed in the same operation as are the members, for instance, by punching out of a metal strip. The punches used are preferably somewhat wider than the members, whereby a possible sideplay of the metal strip while being guided beneath the punch does not lead to the formation of any faulty members.

When the fastener is closed, in order to prevent the members from becoming disengaged by relative movement perpendicularly to the plane of the tapes, the edges 16 of the tapes extend to substantially the middle of the interlocking elements as shown in Fig. 1, so that each tape forms a stop for the interlocking elements on the other tape. This is more clearly shown in Fig. 2.

In this way, also, the fastener members are entirely covered by the tapes on one side and are therefore invisible from that side, as will be appreciated from Figs. 1 and 2. However, it may be sufficient for the edges of the tapes to not quite touch each other, so as to leave parts of the members visible between them. This is preferred in the case of non-metallic fastener members.

The fastener is closed and opened by a slider in known manner. As the members are fixed on one side of the tape only, the slider may consist of one plate only which embraces the members from behind and is secured against disengagement in known manner. Alternatively, the slider may comprise two plates, the front-plate, however, being so small that it does not slide on the tape.

Instead of providing a separate covering head for each projection, as shown in Figs. 1 and 2, a plurality of projections may be covered by a common covering head or plate. Two examples are shown in Figs. 3 and 4.

In Fig. 3, the members 10 of each tape are taken in pairs, each pair of members having a common washer 17 placed over the projection 11 and covered by a common head-plate 18 in the form of an oblong. In Fig. 4, the common covering head 28 has a circular shape. In this figure, the projections 27 are not circular in cross-section as illustrated in Figs. 1 and 3, but have a square or rectangular cross-section. The heads may be ornamented, e. g. in the shape of precious stone facets, or small stars, rods or the like, as shown at 50 in Fig. 4. The projection 11 illustrated in Fig. 2 has a uniform cross-section. The projection may, however, be of such shape as to provide a positive key with the material of the covering head. Figs. 5 to 7 show examples of suitable forms of projections for this purpose. In Fig. 5, the fastener member 19 has a projection 23 which is formed with an enlarged extremity. In Fig. 6, the projection 24 of the member 20 is waisted. The projection 25 of the member 21 of Fig. 7 is enlarged at its extremity and has an eye 22 or alternatively a groove. The extremity of the projection may be enlarged either during manufacture of the fastener or after the projection has been passed through the tape. Instead of enlarging the extremity of the projection, the required result may equally well be obtained by recessing the projection.

In Fig. 8 the fastener member 31 straddles the edge of the tape 30. The member 31 is provided with an undercut projection or dovetail 32 for keying to a covering head 33, preferably made of a non-metallic material. The head may be sprayed, moulded, pressed or glued on to the projection. The head may cover the entire visible part of the member or alternatively, only a part thereof as illustrated. Fig. 9 illustrates the reverse keying arrangement, the fastener member 34 having an undercut recess or dovetail groove receiving a complementary projection 35 on the head 36.

If the coupling elements have the form of rib-like projections and corresponding recesses extending through the whole width of the members, the members may be secured against sideward displacements by the covering heads covering entirely or partially the ends of the coupling elements instead of by the tapes.

I claim:

1. In a sliding clasp fastener, a pair of tapes, cooperating series of fastener members arranged on one side of said tapes, each of said members being provided on one side with a projection passing through said tape, and series of heads arranged along one side of said members and being secured to said members by means of recesses covering said projections of said members.

2. In a sliding clasp fastener, a pair of tapes, cooperating series of fastener members arranged on one side of said tapes, each of said members being provided on one side with a projection passing through said tape, and series of heads of non-metallic, moldable material arranged along one side of said members and being secured to said members by means of recesses covering said projections of said members.

MARTIN WINTERHALTER.